(12) United States Patent
Lucas

(10) Patent No.: US 12,310,351 B1
(45) Date of Patent: May 27, 2025

(54) INSECT COLLECTION DEVICE

(71) Applicant: Scott Lucas, Hoover, AL (US)

(72) Inventor: Scott Lucas, Hoover, AL (US)

( * ) Notice: Subject to any disclaimer, the term of this patent is extended or adjusted under 35 U.S.C. 154(b) by 0 days.

(21) Appl. No.: 18/506,559

(22) Filed: Nov. 10, 2023

(51) Int. Cl.
*A01M 3/00* (2006.01)

(52) U.S. Cl.
CPC .................... *A01M 3/005* (2013.01)

(58) Field of Classification Search
CPC ....... A01M 3/005; A01K 51/00; A01K 55/00; A01K 57/00
See application file for complete search history.

(56) References Cited

U.S. PATENT DOCUMENTS

| | | | |
|---|---|---|---|
| 454,720 A | 6/1891 | Dexter | |
| 970,181 A | 9/1910 | Carter | |
| 2,879,620 A | 3/1959 | McGinnis | |
| 2,931,127 A | 4/1960 | Mayo | |
| 2,992,770 A * | 7/1961 | Keiser | A01M 3/005 |
| | | | 417/478 |
| 3,711,987 A | 1/1973 | Fisk | |
| 3,965,608 A | 6/1976 | Schuman | |
| 4,488,331 A | 12/1984 | Ward | |
| 4,607,451 A | 8/1986 | Jarecki | |
| 4,631,858 A | 12/1986 | Kahle | |
| 4,780,986 A | 11/1988 | Broomfield | |
| 4,794,725 A | 1/1989 | Numerick | |
| 4,850,133 A | 7/1989 | Burzdak | |
| 4,858,376 A | 8/1989 | Reed | |
| 4,918,857 A | 4/1990 | Wade | |
| 4,979,330 A | 12/1990 | Rorant | |
| 5,052,147 A | 10/1991 | Broomfield | |
| 5,116,219 A | 5/1992 | Zimmerman | |
| 5,175,960 A | 1/1993 | Wade | |
| 5,305,495 A | 4/1994 | Nelsen | |
| 5,367,821 A | 11/1994 | Ott | |
| 5,537,777 A | 7/1996 | Geeting | |
| 6,226,919 B1 | 5/2001 | Septer | |

(Continued)

FOREIGN PATENT DOCUMENTS

| | | |
|---|---|---|
| CN | 216983292 | 7/2022 |
| WO | 2008118061 | 10/2008 |

OTHER PUBLICATIONS

BeeAware; https://web.archive.org/web/20200308003635/https://beeaware.org.au/archive-pest/small-hive-beetle/#ad-image-0 (Year: 2020).*

(Continued)

*Primary Examiner* — Christopher D Hutchens
(74) *Attorney, Agent, or Firm* — AdamsIP, LLC; Earl Reed; Edward Brinkley Garner, III

(57) ABSTRACT

A device and method for removing insects, specifically small hive beetles, from a beehive without harming the hive or the bees. The device includes a collection tube, a collection chamber, a vacuum, and a power source. The vacuum is fluidly connected to the collection tube such that the vacuum creates suction at the entrance to the collection tube. A user may insert the tip of the collection tube into the individual cells of a beehive to remove any pest insects from the cells of the hive. Further, a user may remove any pests from the corners and surfaces surrounding the hive. The device is configured to create an appropriate amount of suction to remove the pests without damaging the structure of the hive or harming the bees therein.

19 Claims, 5 Drawing Sheets

(56) References Cited

U.S. PATENT DOCUMENTS

| | | |
|---|---|---|
| 6,568,125 B2 | 5/2003 | Kleinhenz |
| 6,574,915 B1 | 6/2003 | Allen |
| 6,640,489 B1 | 11/2003 | Boulton |
| 6,651,380 B2 | 11/2003 | Wyers |
| 6,662,489 B2 | 12/2003 | Spiro |
| 6,843,985 B2 | 1/2005 | Erickson, Jr. |
| 7,309,274 B2 | 12/2007 | Teal |
| 7,404,269 B2 | 7/2008 | Collins |
| 7,423,068 B2 | 9/2008 | Erickson, Jr. |
| 7,565,764 B2 | 7/2009 | Collins |
| 7,632,167 B1 | 12/2009 | Miller |
| 7,757,433 B2 | 7/2010 | Levot |
| 8,066,988 B1 | 11/2011 | Teal |
| 8,074,395 B2 | 12/2011 | Jancic |
| 8,276,313 B2 | 10/2012 | Reime |
| 8,640,381 B2 | 2/2014 | Al-Qaffas |
| 8,701,338 B1 | 4/2014 | Walsh, Jr. |
| 8,701,339 B1 | 4/2014 | Walsh |
| 8,844,192 B2 | 9/2014 | Yamada |
| 10,178,862 B1 | 1/2019 | Pickrell |
| 10,729,120 B2 | 8/2020 | Tori |
| 10,834,906 B2 | 11/2020 | Wallace |
| 10,881,094 B2 | 1/2021 | Guo |
| 11,278,018 B2 | 3/2022 | Eom |
| 11,490,609 B2 | 11/2022 | Cherukumalli |
| 11,540,503 B2 | 1/2023 | Guo |
| 2005/0246945 A1 | 11/2005 | Evink |
| 2006/0248786 A1 | 11/2006 | Wolf |
| 2007/0169403 A1 | 7/2007 | Collins |
| 2008/0127549 A1 | 6/2008 | Russik |
| 2009/0068926 A1* | 3/2009 | Venglar ............ A01K 57/00 449/20 |
| 2012/0055073 A1 | 3/2012 | Darby |
| 2013/0014429 A1 | 1/2013 | Meskouris |
| 2014/0047759 A1 | 2/2014 | Almy |
| 2015/0020436 A1 | 1/2015 | James |
| 2019/0104719 A1 | 4/2019 | Guo |
| 2021/0219536 A1* | 7/2021 | Gangarosa ............ A01M 3/005 |
| 2022/0183519 A1* | 6/2022 | Veprek ............ A47L 9/0009 |

OTHER PUBLICATIONS

Bug Farmer; https://www.youtube.com/watch?v=Y8AfBG-hV80; Sep. 29, 2023 (Year: 2023).*

Bug Farmer; https://www.youtube.com/watch?v=Of_G36a79Ww; Dec. 29, 2023 (Year: 2023).*

Saker 3 in 1 Product Page; https://www.walmart.com/ip/Saker-3-1-Mini-Vacuum-Cleaner-Wireless-Handheld-Car-Brushless-Motor-12000PA-High-Power-TypeC-Portable-Cleaner-Car-Office-Home-Cleaning/1147516685 (Year: 2024).*

* cited by examiner

INSECT COLLECTION DEVICE

FIELD OF THE DISCLOSURE

The subject matter of the present disclosure refers generally to insect collection devices, specifically those used to collect pest insects from a beehive.

BACKGROUND

Honeybees are an essential part of the ecosystem due to their role as pollinators. It is estimated that over one-third of the food supply in the United Stated depends on honeybees for pollination. In addition to their role as pollinators, honeybees produce honey, beeswax, oils, propolis and other useful and beneficial materials.

Despite the vital role that honeybees play in the ecosystem, honeybees are in decline. Honeybees are fragile insects and are affected by environmental factors. Honeybees are sensitive to chemical insecticides as well as the pests the insecticides are used to prevent. Certain pests can eradicate a honeybee colony very quickly if a beekeeper does not take preventative measures. One such pest, the small hive beetle, can quickly overtake a hive if left untreated.

The small hive beetles enter a beehive and cause damage to the honeycomb, the bee larvae and brood, the stored honey, and pollen. Further, if a small hive beetle infestation is sufficiently heavy, the small hive beetle infestation can cause the bees to abandon the hive altogether. The beetles are difficult to treat and control due to their size and their ability to enter and hide within the cells and crevices of the hive.

There are few known methods of treating or preventing small hive beetle infestations. The current method of controlling small hive beetles are oil traps and beetle sheets that trap the beetles and prevent them from causing damage to a hive. Alternatively, once a beekeeper detects small hive beetles, there are chemical insecticides that may be used to kill the beetles; however, these insecticides can cause issues with the harvested honey, and they may not be effective to eliminate an established small hive beetle infestation. Further, insecticides are generally not environmentally friendly and may not be used for organic farmers and beekeepers.

As such, there is a need for an improved method to control small hive beetles that does not require the use of chemicals.

SUMMARY

A vacuum device for vacuuming small hive beetles out of a hive is provided. The device is portable, battery operated, and contains a collection tube to allow a user to individually target small hive beetles in a honeycomb.

In one embodiment, the device comprises a battery, a vacuum, a collection tube, a collection container, and a filter. The vacuum is operated by electric power provided from the battery. A vacuum hose then fluidly connects the vacuum inlet to the collection container. The collection container is connected to the hose at the collection container outlet and to the collection tube at the collection container inlet. A filter can be disposed between the collection container inlet and the collection container outlet to prevent small hive beetles from entering the vacuum and causing damage to the vacuum.

Some embodiments of the collection container are reusable. Specifically, the collection container can be removed, emptied, and reattached to the device such that it can be fully reused.

The vacuum is configured to create enough suction to pull in small hive beetles but not enough that the wall of the honeycomb is damaged. Further, the suction is not strong enough to harm the bees that are close to the end of the collection tube.

In some embodiments, the vacuum hose can have an in-line air filter disposed between the vacuum and the collection container. The filter is designed to catch debris that is pulled through the collection chamber before the debris enters and causes damage to the vacuum. The device can therefore be used to catch and trap small hive beetle larvae and eggs to prevent the spread of the small hive beetles.

Another aspect of the disclosure is a method of removing small hive beetles using the vacuum device. To use the device, a user puts the tip of the collection tube into or close to a cell of a beehive having a small hive beetle. The tip of the collection tube is sized such that it can be inserted into most types of cells in the beehive, or very close to the cell openings, without damaging the comb structure.

When the device is powered on, the vacuum pulls any small hive beetles, eggs, or small hive beetle larvae into the opening and deposits them into the collection chamber. The user may individually clean the cells of a hive to remove most or all small hive beetles. Additionally, as beetles may reside anywhere in the hive, the device may be used to remove any small hive beetles, larvae, eggs, or droppings from the bottom and corners of the hive. In some embodiments, the tube can be extended to access hard to reach areas of the hive with little disturbance to the colony.

After the hive has been cleared of small hive beetles, the user may open the collection container and dispose of the contents. Optionally, a user may use a compound such as ethanol or vegetable oil to euthanize the beetles prior to disposal.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other structures for carrying out the same purpose of the system and method disclosed herein. Those skilled in the pertinent art should also realize that such equivalent designs or modifications do not depart from the scope of the system and method of the present disclosure.

DESCRIPTON OF THE DRAWINGS

These and other features, aspects, and advantages of the present disclosure will become better understood with regard to the following description, appended claims, and accompanying drawings where:

DETAILED DESCRIPTION

In the Summary above and in this Detailed Description, the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Figure 1:
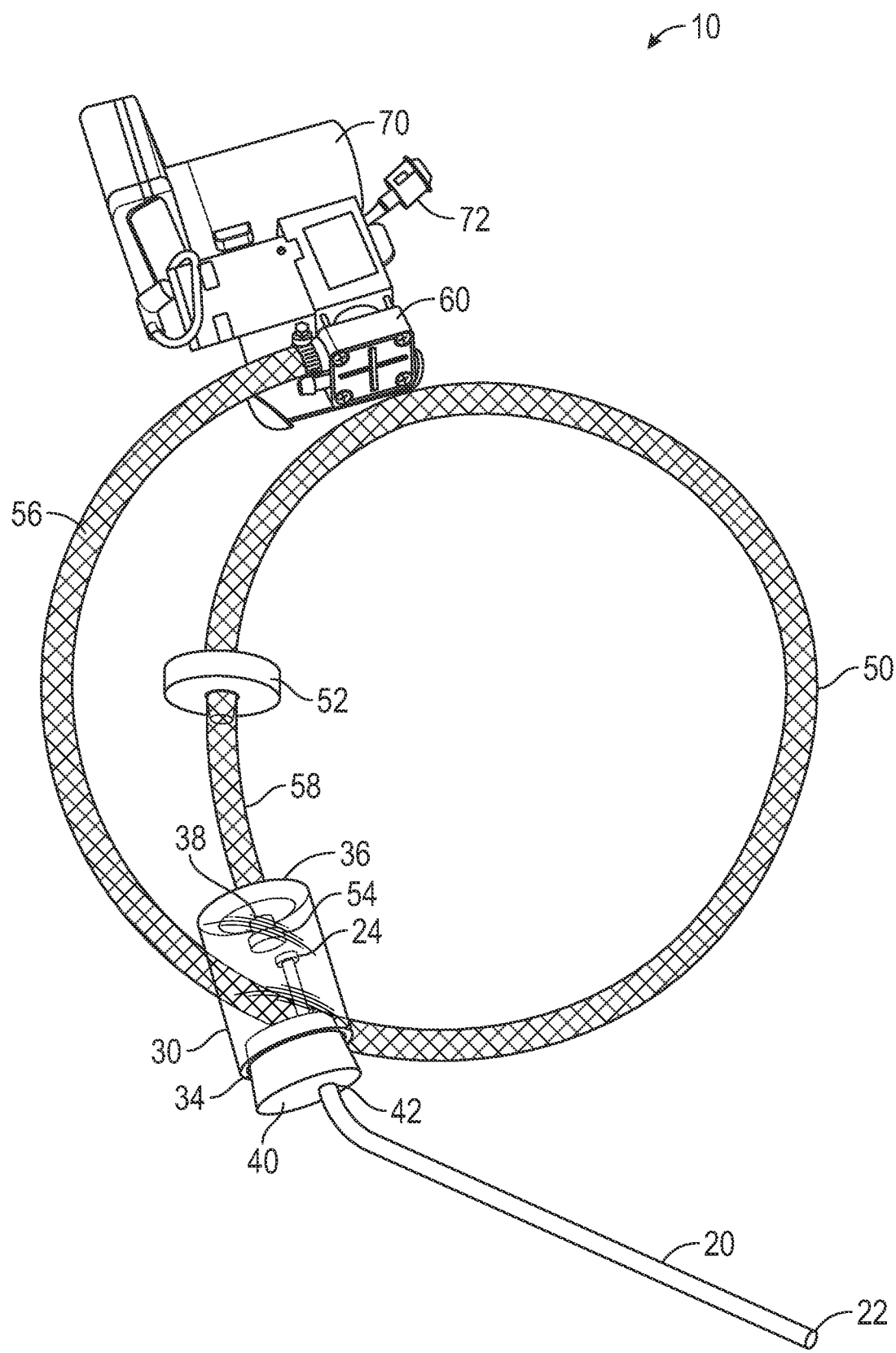
FIG. 1 shows a perspective view of an insect collection device consistent with the principles of the present disclosure.

As shown in FIG. 1, an insect collection device 10 generally comprises a collection chamber 30, a collection tube 20, a vacuum hose 50, a vacuum 60, and a battery 70. The vacuum is fluidly connected to the collection chamber 30 by the vacuum hose 50. The collection tube 20 is inserted through a hole 42 in a rubber stopper 40 which seals the front end 34 of the collection chamber 30 except for the collection tube. Thus, the vacuum 60 is fluidly connected to the inlet 22 of the collection tube 20.

The collection chamber 30 forms a volume defined by one or more sidewalls 32. In a preferred embodiment, the collection chamber is generally cylindrical and comprises an open front end 34 and a rear end 36 which are connected by one or more sidewalls 32. The collection chamber is fluidly sealed on both the front end and the rear end with an end of the vacuum hose 50 being inserted into the rear wall of the collection chamber and the rubber stopper 40 inserted into the front end of the collection chamber.

The rubber stopper 40 is configured to be removably inserted into the open front end 34 of the collection chamber 30 such that a user can remove the rubber stopper and empty the contents of the collection chamber. The rubber stopper has a through hole 42 that is sized to securely accept the collection tube 20. Thus, the collection tube 20 can be inserted through the hole while preventing air from entering the hole around the collection tube. In some embodiments, a sealant, such as silicone, oil, or grease, may be used to ensure an air-tight connection.

As with the connection between the rubber stopper 40 and the collection chamber 30, the vacuum hose 50 is securely inserted into a hole 38 in the rear wall of the collection chamber in an airtight manner. A sealant may be used to ensure a secure, airtight connection between the vacuum hose and the collection container. As such, the vacuum is in fluid communication with the collection tube, such that the collection tube pulls air through an inlet 22 due to the negative pressure created by the vacuum.

In some embodiments, the rubber stopper 40 is a half inch stopper having an upper diameter of 43 mm and a bottom diameter of 36 mm; however, any suitable size of stopper is contemplated without deviating from the disclosure.

In some embodiments, an inline air filter 52 is positioned along the vacuum hose 50 between the collection chamber 30 and the vacuum 60. The air filter 52 is sized to catch particles and prevent those particles from being pulled into the vacuum. Preferably, the air filter is replaceable to allow a user to remove and replace a used filter with a new clean filter.

As shown, the inline air filter 52 can be positioned between a first section 56 and a second section 58 of vacuum hose. The filter can be removably connected to the first 56 and second sections 58 to allow a user to replace the filter as needed. In one embodiment, the filter has a conical protrusion on each end that is inserted into the first section 56 and second section of vacuum hose 58 to create an airtight connection. In an alternative embodiment, the filter can be directly connected to the collection chamber without the need to use a second section of vacuum hose 50.

Figure 2:
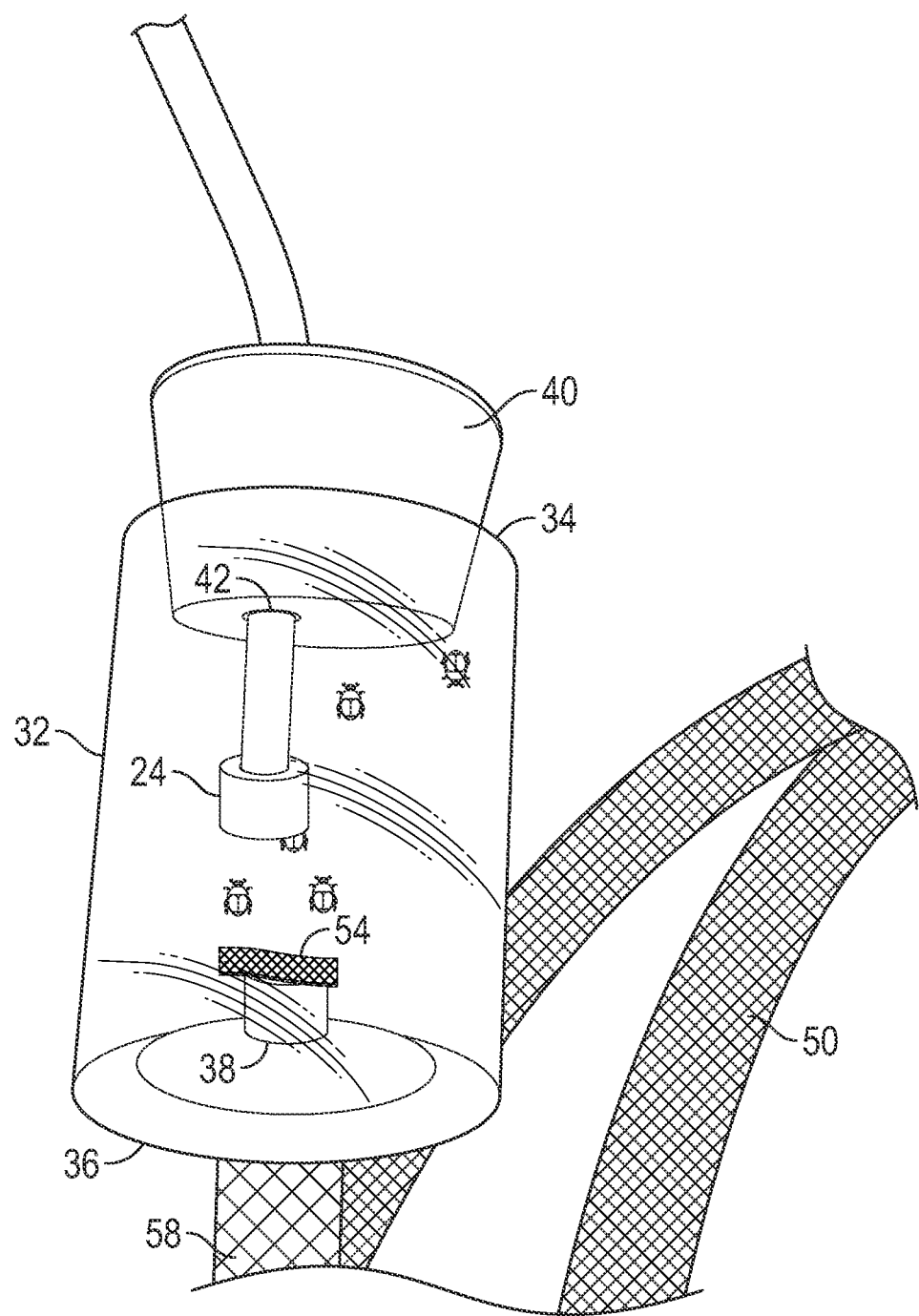
FIG. 2 shows a perspective view of a collection chamber consistent with the principles of the present disclosure.

FIG. 2 shows an enlarged view of the collection chamber 30. In a preferred embodiment, the rear end of the collection tube 20 contains a one way valve 24. This valve 24 prevents any collected insects from exiting the collection chamber when the vacuum is not in use. Although a check valve is depicted, any suitable one-way valve can be used without deviating from the disclosure.

On the opposite end from the collection tube 20, the vacuum hose 50 is inserted through a hole in the collection chamber. The end of the vacuum hose that is inserted in the collection chamber 30 can include a filter, screen, or other covering 54 to prevent insects from entering the vacuum hose 50 and causing damage to the vacuum 60.

In preferred embodiments, the collection chamber 30 is transparent and is made of hard plastic. However, in alternative embodiments the collection chamber may be made of glass or metal.

In some embodiments, the collection chamber 30 is reusable. In these embodiments, a user can remove the rubber stopper 40 and empty the collected materials from the collection chamber 30. In other embodiments, the collection chamber is disposable. In these embodiments, the collection tube 20 and the vacuum hose 50 may be removed from the collection chamber before the collection chamber is discarded. A new collection chamber may then be provided and the vacuum hose and collection tube may be inserted into the collection chamber prior to using the device.

Figure 3:
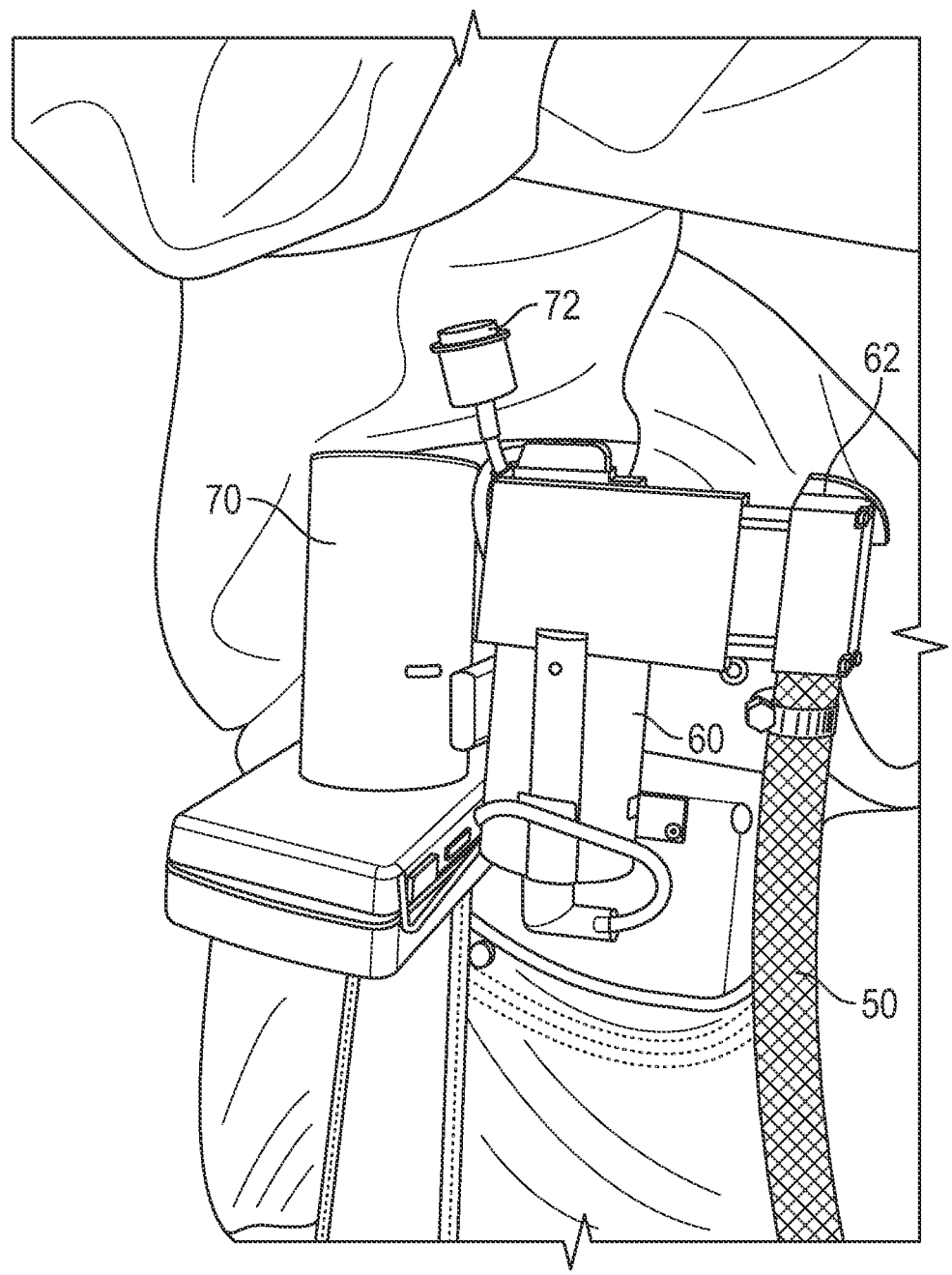
FIG. 3 shows a perspective view of a vacuum and battery consistent with the principles of the present disclosure.
Figure 4:
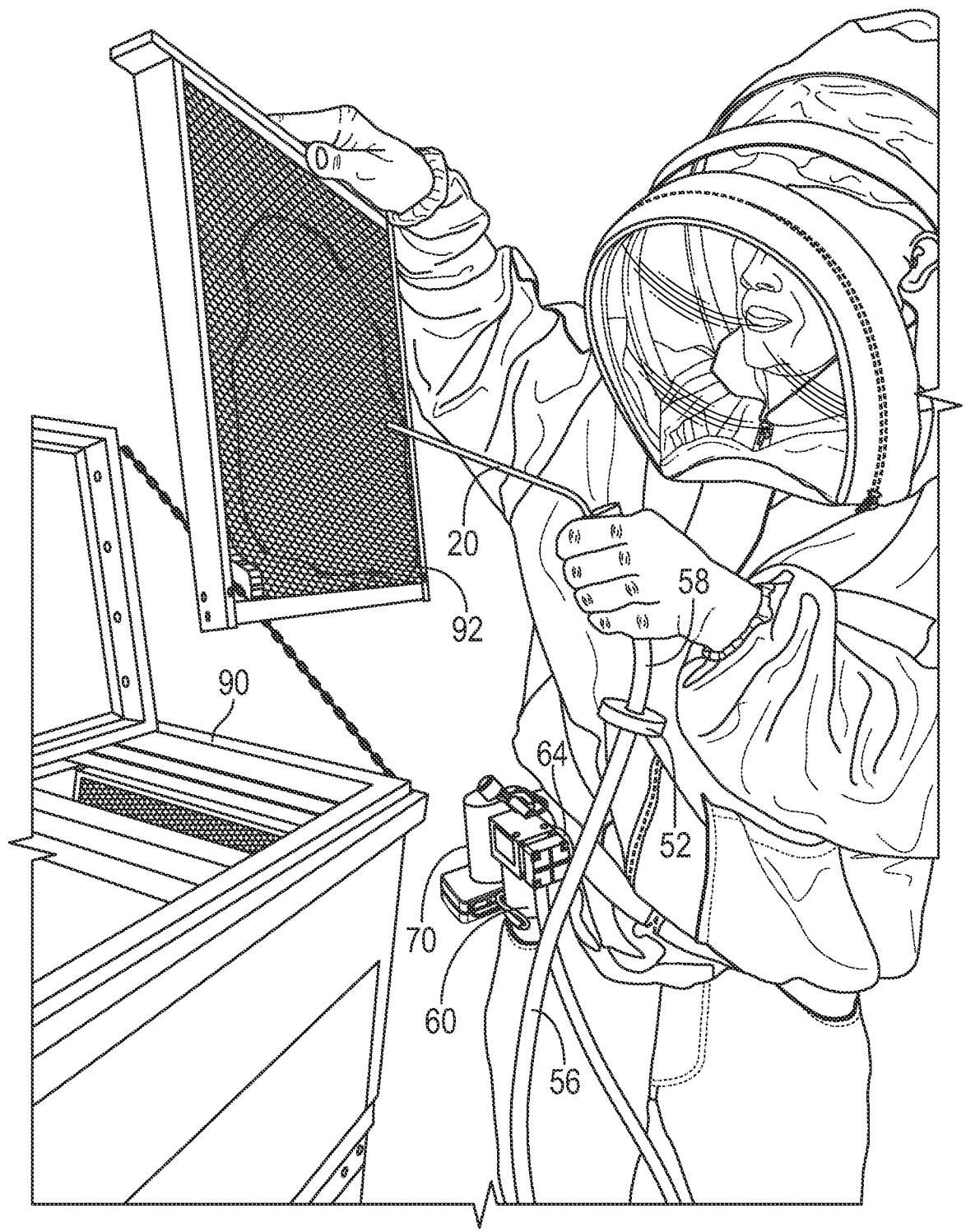
FIG. 4 shows a perspective view of a device in a state of use consistent with the principles of the present disclosure.

In some embodiments, like the one shown in FIGS. 3 and 4, the vacuum 60 and battery 70 can be attached to a mount 62 having a clip 64 that is configured to be attached on a user's clothing, such as a belt or pants. This allows a user to use both hands without needing to hold the vacuum and battery. Further, the user may easily activate the power switch 72 due to its location on the device. In some embodiments, the power switch 72 is located between the battery 70 and vacuum 60. Alternatively, this configuration can allow multiple users to operate the device if, for example, one user needs to hold up a comb of the beehive while another navigates the collection tube into the cells to remove the hive beetles or other pest insects.

As shown in FIG. 4, the collection tube 20 is sized to be inserted into a cell 92 of a bee hive 90. As such, the collection tube 20 is generally tubular having an exterior diameter of between 6.5 and 5 mm and an interior diameter of between 5 and 4.5 mm. In a preferable embodiment, the exterior diameter is approximately 5 millimeters (mm) and the interior diameter is approximately 4.7 millimeters. This size allows the front end 22 of the collection tube to be inserted into or close to the cell openings of a beehive and remove any pests, small hive beetles, and small hive beetle eggs from the cells. In some embodiments, the inner diameter of the front end 22 of the collection tube is increased by removing material from the inside of the collection tube to provide a wider opening for removing debris or small hive beetles from the hive. Further, the collection tube 20 is preferably rigid and made from either metal or hard plastic; however, some embodiments can contain a semi-flexible collection tube without deviating from the disclosure.

The collection tube 20 may be any suitable length, but preferably has a length of between 15 and 30 centimeters (cm). Further, the depicted embodiment shows a collection tube 20 having a bend proximal the connection with the rubber stopper 40. The bend is positioned to be between the front end 22 of the collection tube 20 and the rubber stopper 40. In the depicted embodiment, the bend is at an angle of approximately 45 degrees; however, any angle that allows the passage of small hive beetles through the collection tube is contemplated without deviating from the disclosure. Further, in some embodiments, the collection tube does not contain a bend.

In some embodiments, such as those shown in the figures, the collection tube 20 is a simple rigid tube having an inlet at the front end 22 of the tube and an outlet at the rear end of the collection tube. In these embodiments, the front end 22 does not contain any additional features except that some embodiments may contain an enlarged internal diameter near the front end 22 of the collection tube 20.

In some embodiments, the collection tube 20 can be extendable. In these embodiments, the collection tube 20 may include a second section that attaches via a connection piece, a separate longer collection tube 20, or a telescoping collection tube.

The vacuum 60 is configured to remove material from the cells of a beehive without damaging the structure of the beehive or the bees. The vacuum pressure created at the front of the collection tube 20 is a function of the collection tube's inner diameter and the strength of the vacuum 60, these components are configured to work together to produce the desired vacuum pressure. As such, the vacuum is powered to create between 41 and 69 kilopascals of negative pressure at the front end 22 of the collection tube 20. In a more preferred environment, the vacuum creates between 54 and 61 kilopascals of negative pressure at the front end of the collection tube. This pressure allows the collection tube 20 to be inserted into the cells and remove unwanted pests, such as small hive beetles, small hive beetle eggs and larvae without damaging the cells of the beehive. Further, this amount of suction may be provided close to honeybees and other desired objects, such as bee larvae and eggs, without pulling those desired objects into the collection tube 20 and removing them from the hive. Thus, a user may use the device without concern about damaging the hive or harming the bees with the suction.

The device is configured to receive power from a power source. The embodiment depicted in the figures is configured to operate on electrical power. Preferably, the electrical power is provided by a rechargeable battery 70, although disposable batteries are contemplated. Although the embodiments depicted in the figures contain a battery 70, the device can alternatively be configured to receive electrical power from an outlet.

As shown in FIGS. 1 and 4, the vacuum hose 50 is flexible and bends as the collection chamber 30 is moved. Some embodiments can include a roll-up mechanism to roll up and store any excess vacuum hose 50 that is not needed by the user. This prevents the excess hose from getting in the way or being damaged from exposure.

The vacuum hose 50 shown in the figures contains two sections. The first section 56 connects the vacuum 60 to the inline air filter 52 and the second section 58 connects the air filter to the collection chamber 30. In the depicted embodiment, the first section 56 of vacuum hose is longer than the second section 58 of vacuum hose. Specifically, in the depicted embodiment, the first section of vacuum hose has a length of approximately 115 centimeters (cm) and the second section of vacuum hose has a length of approximately 13 cm. Other embodiments can have different lengths of vacuum hose without deviating from the disclosure. Further, although the depicted embodiment is shown to have two sections of vacuum hose separated by an inline air filter 52, the device can have a single section of tube and either no inline filter, or a filter that is directly connected to the collection chamber.

Figure 5:
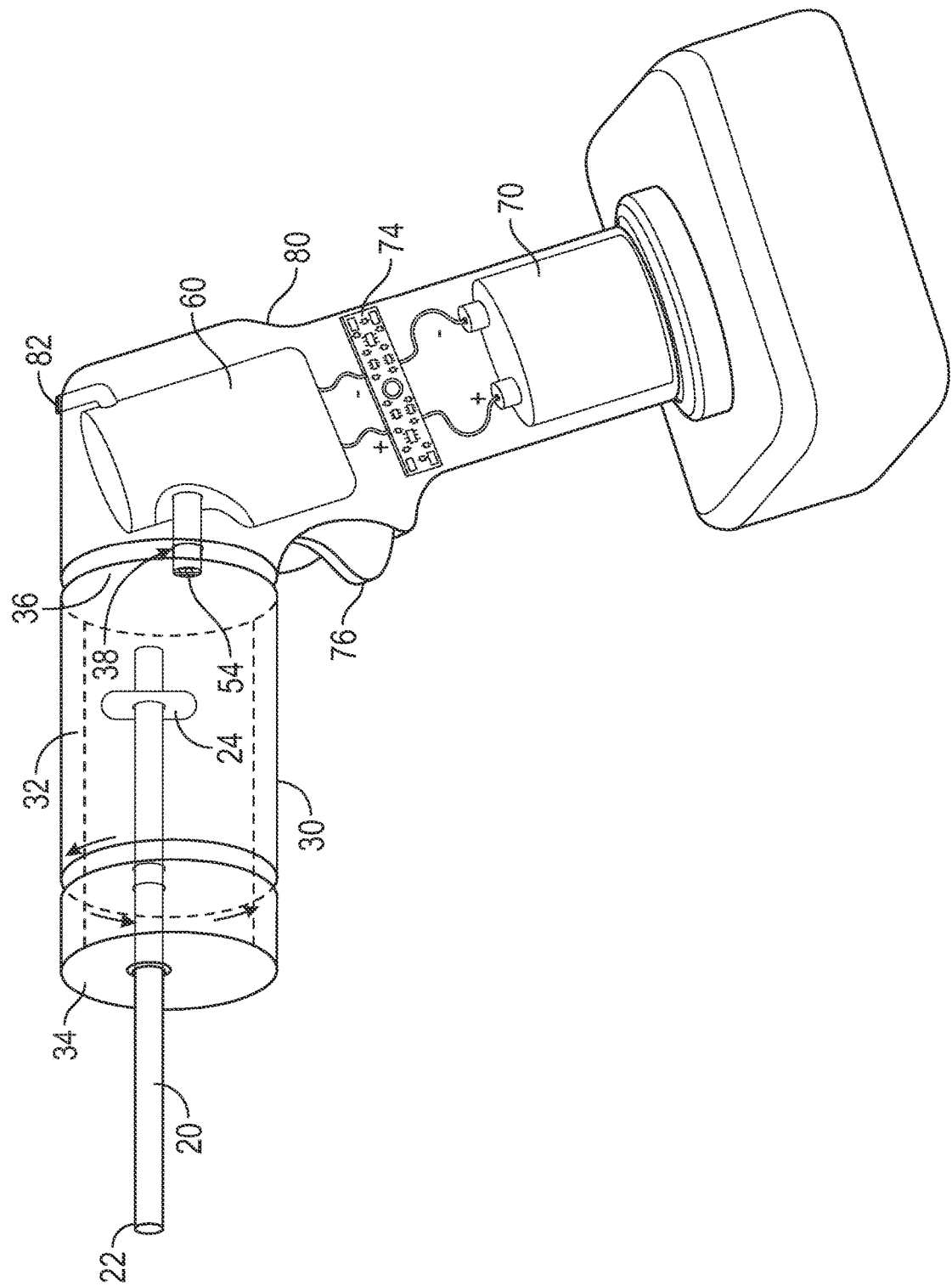
FIG. 5 shows another embodiment of an insect collection device consistent with the principles of the present disclosure.

FIG. 5 depicts an alternative embodiment of an insect collection device 10. The device contains a collection tube 20, a translucent collection chamber 30, and a vacuum 60, surrounded by a housing 80. The housing 80 is designed to be handheld and contain all components of the device. Further, the housing can contain a door or removable section to allow a user to access the collection chamber 30, battery 70, vacuum 80, and other internal components.

As with the previous embodiments, the collection chamber 30 is formed by at least one sidewall 32. The rear end 36 of the collection container is solid and contains a port 38 through which an end of the vacuum hose 50 is inserted. In some embodiments, the front end 34 and the rear end 36 of the collection chamber are removable via a threaded connection with the sidewall 32. In other embodiments, the collection chamber is removable through other removable connection means, such as snap fits, pin and groove, fittings, or other means known in the art. Thus, the front end 34 and sidewall 32 of the collection chamber 30 can be removed from the housing 80 for cleaning and/or maintenance. In some embodiments, the collection chamber 30 is formed from clear plastic to allow a user to view the contents within the collection chamber.

In some embodiments, the rear wall 36 of the collection chamber is formed with the housing 80. In these embodiments, the sidewall 32 of the collection chamber is removably attached to the housing 80 via threads or similar removable connection means to allow the collection chamber 30 and collection tube 20 to be removed from the housing. The collection chamber can thus be disconnected from the housing 80 to be emptied and cleaned after use. Further, in some embodiments, the rear wall of the collection chamber can also be removed through a threaded connection, spring loaded means, or other means known in the art.

The collection tube 20 extends through a through hole in the front end 34 of the collection chamber to pull pests and other unwanted objects into the collection chamber 30. The collection tube 20 can contain a one-way valve 24 or similar mechanism to prevent pests, such as small hive beetles, from escaping the collection chamber through the collection tube 20. The collection tube 20 is preferably made from metal or rigid plastic and has an outer diameter of between 4.5 mm and 6 mm and an inner diameter between 4 mm and 5 mm. In a preferred embodiment, the collection tube has an outer diameter of approximately 5 mm and an inner diameter of approximately 4.7 mm. In some embodiments, the inner diameter of the front end 32 of the collection tube can be widened by removing material from the inside of the collection tube to provide a wider opening to collect material, such as small hive beetles.

The vacuum hose 50 extends through a port 38 in the rear end 36 of the collection chamber 30. In some embodiments, the port 38 is located in the center of the rear end 36 of the collection chamber. The vacuum hose has an inner diameter of approximately 7 mm and an outer diameter of approximately 14 mm, however, the vacuum hose size may be altered without deviating from the substance of the disclosure. A screen 54 prevents the small hive beetles and/or larger debris from being pulled through the vacuum hose 50 into the vacuum. An in-line filter 52 can be disposed between the collection chamber and the vacuum to prevent smaller debris or pests, such as small hive beetle eggs or larvae, from entering and damaging the vacuum 60.

The vacuum 60 is electrically connected to a power source. In a preferred embodiment, the power source is a rechargeable battery 70. The device can further include a circuit board 74. The circuit board 74 can include a power switch or button 76 that extends beyond the housing 80 to allow a user to operate the insect collection device. In some embodiments, a power switch 76 extends through the housing 80 and is positioned between the battery 70 and the vacuum 60 without a circuit board. In some embodiments, a trigger 76 is connected to the battery and extends from the housing 80 to allow the user to selectively operate the vacuum. Further, the vacuum 60 can have an exhaust tube 82 that extends through the housing and vents the air pulled through the collection tube 20 by the vacuum 60.

The battery 70 can be configured to removably attach to the housing 80 and allow the battery to be removed and charged outside of the housing. In alternative embodiments, the battery can be disposable and replaced.

Another aspect of the disclosure is a method of removing small hive beetles or other pests from a beehive. The method first includes the step of providing a device comprising a vacuum 60, a collection chamber 30, and a collection tube 20. The vacuum, collection chamber, and collection tube are in fluid connection such that the suction generated by the vacuum 60 creates suction at the end of the collection tube 20.

In a next step, a front end 22 of the collection tube 20 is inserted into a cell of a beehive containing a pest or unwanted object, such as a small hive beetle, small hive beetle eggs, or small hive beetle larvae. The device removes the pests, beetles, eggs, and/or larvae from the cell, pulls them through the collection tube 20 and deposits them in collection chamber 30 for disposal.

The collection chamber 30 is then opened at a front end 34 and the contents are emptied. This opening step may be accomplished by removing a rubber stopper 40 from the collection chamber 30. In a preferred embodiment, the rubber stopper may be connected to the collection chamber via a hinge or contain threads to allow for easy removal. The rubber stopper is inserted into a front end 34 of the collection chamber 30. As described above, the rubber stopper has a through hole which the collection tube can be inserted into. Preferably, hole 42 is sized to allow the collection tube 20 to be inserted through the hole and still provide a seal. In some embodiments, the rubber stopper 40 is replaced with front wall that is either removably attached to or integrally formed with the sidewall 32.

In some embodiments, the method includes the step of vacuuming the bottom and corners of a beehive to remove any pests or debris, such as small hive beetles, small hive beetle eggs, small hive beetle larvae, and/or small hive beetle waste from the beehive. In some embodiments, the device can include an extendable collection tube 20 or a separate, longer collection tube to allow for easy access to the hard to reach places within the hive. In these embodiments, the user can extend the collection tube 20 by attaching an extension section via a connection piece, extend the collection tube 20 by telescopic means, or by removing the rubber stopper and replacing the collection tube with a longer collection tube.

The method can include providing an in-line air filter 52 along a vacuum hose 50 that is positioned between the vacuum 60 and the collection chamber 30. Further steps can include removing a used filter and replacing it with a new filter.

The method can also include the step of using isopropyl alcohol or vegetable oil to euthanize pests within the collection chamber 30. Although the disclosure contemplates using a substance to euthanize the beetles, the collected beetles may instead be disposed of by sealing them in a bag or flushing them down a drain.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flow depicted in the accompanying figures and/or described herein do not necessarily require the particular order shown, or sequential order, to achieve desirable results. It will be readily understood to those skilled in the art that various other changes in the details, materials, and arrangements of the parts and method stages which have been described and illustrated in order to explain the nature of this inventive subject matter can be made without departing from the principles and scope of the inventive subject matter.

What is claimed is:

1. A device for removing pests from a beehive, the device comprising:
    a vacuum, a collection container, and a collection tube;
        wherein the collection tube begins at a collection tube inlet and ends at a collection tube outlet;
        wherein the collection tube has an internal diameter of between 4.5 and 5 millimeters;
        wherein the collection tube is rigid;
        wherein the collection container has a collection container inlet and a collection container outlet;
        wherein the collection tube outlet connects to the collection container inlet;
        wherein the vacuum is fluidly connected to the collection container outlet by a flexible hose.

2. The device of claim 1, wherein the collection tube has an internal diameter of approximately 4.7 millimeters at the collection tube inlet.

3. The device of claim 2, wherein the collection tube has an external diameter of between 5 millimeters and 6 millimeters.

4. The device of claim 1, further comprising an air filter, wherein the air filter is connected to the flexible hose.

5. The device of claim 1, further comprising a battery configured to power the vacuum and having a power switch located between the battery and the vacuum.

6. The device of claim 1, wherein the vacuum creates a vacuum pressure of between 40 and 70 kilopascals at the collection tube inlet.

7. The device of claim 1, wherein the collection container inlet comprises a rubber stopper having an opening and the collection tube is configured to be inserted through the opening.

8. The device of claim 1, wherein the collection container contains a check valve positioned at the collection container inlet.

9. A device for collecting insects, the device comprising:
a vacuum, a collection container, and an elongated collection tube;
wherein the vacuum creates a vacuum between 40 and 70 kilopascals;
wherein the collection tube comprises an inlet and an outlet and has an external diameter of approximately 5 millimeters;
wherein the collection container is removably attached to the collection tube; and
wherein the collection container is removably attached to the vacuum.

10. The device of claim 9, wherein the internal diameter of the collection tube is between 4.5 and 5 millimeters.

11. The device of claim 9, wherein the vacuum is connected to the collection container by a flexible hose.

12. The device of claim 11, wherein the flexible hose contains an in-line air filter.

13. The device of claim 9, wherein the vacuum contains a mount configured to support and hold the vacuum and a power source.

14. A method of removing small hive beetles from a beehive, the method including the following steps:
providing a device comprising a vacuum, a collection container, and a collection tube;
the vacuum being fluidly connected to the collection container and the collection tube;
inserting an inlet end of the collection tube into a cell of the beehive containing at least one small hive beetle; and
using the vacuum to pull the at least one small hive beetle through the inlet end of the collection tube and into the collection container of the device;
wherein the vacuum creates a suction pressure of between 41 and 69 kilopascals at the inlet end of the collection tube to pull the small hive beetles into the collection container.

15. The method of claim 14, further comprising the following steps:
opening the collection container;
euthanizing the at least one small hive beetle within the collection container; and
emptying the collection container.

16. The method of claim 14, wherein the inserting an inlet end of the collection tube is accomplished using a collection tube having an external diameter of approximately 5 millimeters.

17. The method of claim 14, further comprising, using the vacuum to remove any small hive beetle eggs from at least one cell of the beehive, an interior bottom surface of the beehive, and/or at least one sidewall of the beehive.

18. The method of claim 14, further comprising the steps of:
charging a battery; and
electrically connecting the battery to the vacuum.

19. The method of claim 18, further comprising the steps of:
mounting the battery and the vacuum onto a mount having a clip; and
securing the clip onto an article of clothing worn by an operator such that the battery and the vacuum are attached to the clothing of the operator.

* * * * *